(12) United States Patent
Wakitani et al.

(10) Patent No.: US 7,267,188 B2
(45) Date of Patent: Sep. 11, 2007

(54) ELECTRIC VEHICLE

(75) Inventors: Tsutomu Wakitani, Wako (JP);
Norikazu Shimizu, Wako (JP);
Toshiaki Kawakami, Wako (JP)

(73) Assignee: Honda Motor Co., Ltd. (JP)

( * ) Notice: Subject to any disclaimer, the term of this patent is extended or adjusted under 35 U.S.C. 154(b) by 198 days.

(21) Appl. No.: 10/949,947

(22) Filed: Sep. 24, 2004

(65) Prior Publication Data

US 2005/0087373 A1 Apr. 28, 2005

(30) Foreign Application Priority Data

Oct. 28, 2003 (JP) .............................. 2003-367839

(51) Int. Cl.
*B62D 11/02* (2006.01)
(52) U.S. Cl. ....................... 180/6.5; 180/6.2; 180/6.48; 180/6.7
(58) Field of Classification Search ................. 180/6.5, 180/6.2, 6.48, 6.7
See application file for complete search history.

(56) References Cited

U.S. PATENT DOCUMENTS

| | | | | | |
|---|---|---|---|---|---|
| 2,605,852 | A | * | 8/1952 | Rhoads ........................ | 180/6.7 |
| 4,674,584 | A | * | 6/1987 | Watkins ........................ | 180/8.2 |
| 5,174,405 | A | * | 12/1992 | Carra et al. .................. | 180/9.32 |
| 5,465,525 | A | * | 11/1995 | Mifune et al. ............. | 43/132.1 |
| 5,509,491 | A | * | 4/1996 | Hall, III ..................... | 180/9.44 |
| 6,141,613 | A | * | 10/2000 | Fan .............................. | 701/50 |
| 6,523,629 | B1 | * | 2/2003 | Buttz et al. ................. | 180/167 |
| 6,604,590 | B2 | * | 8/2003 | Foulk, Jr. ................... | 180/65.1 |
| 6,805,218 | B2 | * | 10/2004 | Wakitani et al. ............ | 180/315 |
| 6,837,318 | B1 | * | 1/2005 | Craig et al. ................. | 180/6.7 |
| 6,886,646 | B2 | * | 5/2005 | Sugimoto et al. .......... | 180/6.48 |
| 2004/0099449 | A1 | * | 5/2004 | Pollman ..................... | 180/6.2 |

FOREIGN PATENT DOCUMENTS

JP  48004260  2/1973
JP  01271317  5/2001

* cited by examiner

*Primary Examiner*—Lesley D. Morris
*Assistant Examiner*—Marlon Arce-Diaz
(74) *Attorney, Agent, or Firm*—Adams & Wilks

(57) ABSTRACT

An electric vehicle has a control unit having a decelerating control function of decelerating an electric motor disposed on a side of a vehicle body corresponding to a turning direction of the electric vehicle, and an accelerating control function of outputting an accelerating control signal for performing acceleration control to accelerate the electric motor when operation of the electric vehicle is switched from a first traveling mode to a second traveling mode. When the electric motor has a speed not exceeding a predetermined reference speed, the accelerating control function performs the acceleration control such that a level of the accelerating control signal is increased abruptly for a temporary time from the switching of the operation of the electric vehicle from the first traveling mode to the second traveling mode.

10 Claims, 11 Drawing Sheets

ELECTRIC VEHICLE

FIELD OF THE INVENTION

The present invention relates to an electric vehicle including left and right electric motors for driving left and right traveling apparatuses, respectively and separately.

BACKGROUND OF THE INVENTION

Electric vehicles of the type concerned are known from, for example, Japanese Patent Publication No. SHO 48-4260 and Japanese Patent Laid-Open Publication No. 2001-271317.

FIG. 11 hereof diagrammatically shows the electric vehicle as disclosed in the publication No. 2001-271317. The electric vehicle designated generally at 200 is a snow removing machine including a machine body 201. The machine body 201 includes a working apparatus 204 comprised of an auger 202 and a blower 203, an engine 205 for driving the working apparatus 204, left and right traveling apparatuses 206, 206 comprised of crawler belts (not shown), left and right electric motors 207, 207 for driving the traveling apparatuses 206, 206, respectively, a generator 209 driven by the engine 205 to supply electric power to a battery 208 and the electric motors 207, 207, and a control unit 211 for controlling the electric motors 207, 207.

An output from the engine 205 is in part used for driving the generator 209. An electric power generated by the generator 209 is supplied to the battery 208. The left and right electric motors 207, 207 are driven by the electric power supplied from the battery 208 for driving the traveling apparatuses 206, 206. The remainder of the output from the engine 205 is transmitted through an electromagnetic clutch 212 to the working apparatus 204 for driving the working apparatus 204.

Generally, when an electric vehicle of the above type makes a turn rightward or leftward, one of left and right electric motors disposed on the same side as the turning direction of the electric vehicle is decelerated to thereby decelerate a crawler belt disposed on the same side as the turning direction of the electric vehicle. Hereinafter, such an electric motor disposed on the same side as the turning direction of the electric vehicle and a traveling apparatus having the crawler belt disposed on the same side as the turning direction of the electric vehicle refer to "turning-side electric motor" and "turning-side traveling apparatus", respectively. When the electric vehicle is to be switched in operation from a turning mode to a straight-traveling mode, the turning-side electric motor is gradually accelerated to thereby accelerate the turning-side traveling apparatus gradually.

In case the turning-side traveling apparatus has a very low speed close to zero, however, the speed of the turning-side traveling apparatus is much lower than that of the traveling apparatus disposed opposite the turning-side traveling apparatus. The speed of the turning-side traveling apparatus can not quickly increase and become equal to the speed of the opposite traveling apparatus under such an influence as inertias of the respective traveling apparatuses.

Especially, since the left and right crawler belts of the traveling apparatuses have large surface areas contacting the ground and large driving power, there is a room left for improvement in the electric vehicle to ensure quick and smooth switching of operation of the electric vehicle from the turning mode to the straight-traveling mode.

SUMMARY OF THE INVENTION

An object of the present invention is to provide an electric vehicle including left and right electric motors for driving left and right traveling apparatuses, respectively and separately, which is capable of quickly and smoothly switching its operation from a turning mode to a straight-traveling mode.

According to an aspect of the present invention, there is provided an electric vehicle comprising: a vehicle body; left and right traveling apparatuses disposed leftward and rightward of the vehicle body, respectively; left and right electric motors for driving the left and right traveling apparatuses, respectively; a control unit for controlling the left and right electric motors, separately; the control unit having: a turning-side electric motor decelerating control function of, when the electric vehicle turns either leftward or rightward, performing deceleration control to decelerate one of the left and right electric motors disposed on the same side as a turning direction of the electric vehicle; and a turning-side electric motor accelerating control function of outputting an accelerating control signal for performing acceleration control to accelerate the one electric motor when operation of the electric vehicle is switched from a turning mode to a straight-traveling mode, wherein when the one electric motor has a speed not exceeding a predetermined minimum reference speed at the time of the switching of the operation of the electric vehicle from the turning mode to the straight-traveling mode, the turning-side electric motor accelerating control function performs the acceleration control such that a level of the accelerating control signal is increased abruptly for a temporary time from the switching of the operation of the electric vehicle from the turning mode to the straight-traveling mode.

The speed of the one electric motor can quickly equalize to that of the opposite electric motor such that the speed of the traveling apparatus disposed on the same side as the turning direction of the electric vehicle can quickly become equal to the speed of the opposite traveling apparatus. Therefore, the snow removing machine can rapidly smoothly switch from the turning to the straight-traveling without giving the operator an unpleasant sensation of handling the snow removing machine.

Preferably, each of the traveling apparatus comprises a crawler belt.

In a preferred form of the present invention, the level of the accelerating control signal is abruptly increased for the temporary time such that the speed of the one electric motor is increased substantially by 35%.

In a further preferred form of the present invention, the turning-side electric motor accelerating control function performs the acceleration control by using an acceleration correction map represented by an acceleration correction coefficient versus time characteristic curve including a pulse-like raised portion having a starting point coincided with the time of the switching of the operation of the electric vehicle from the turning mode to the straight-traveling mode, a peak point and an end point, the acceleration correction coefficient increasing from the starting point to the peak point and decreasing from the peak point to the end point, the acceleration correction coefficient at the end point being larger than at the starting point.

Preferably, the acceleration correction coefficient at the peak point is set such that the speed of the one electric motor is increased substantially by 35%.

In a further preferred form of the present invention, the pulse-like raised portion is triangular.

BRIEF DESCRIPTION OF THE DRAWINGS

A certain preferred embodiment of the present invention will hereinafter be described in detail, by way of example only, with reference to the accompanying drawings, in which.

DETAILED DESCRIPTION OF THE PREFERRED EMBODIMENTS

Figure 1:
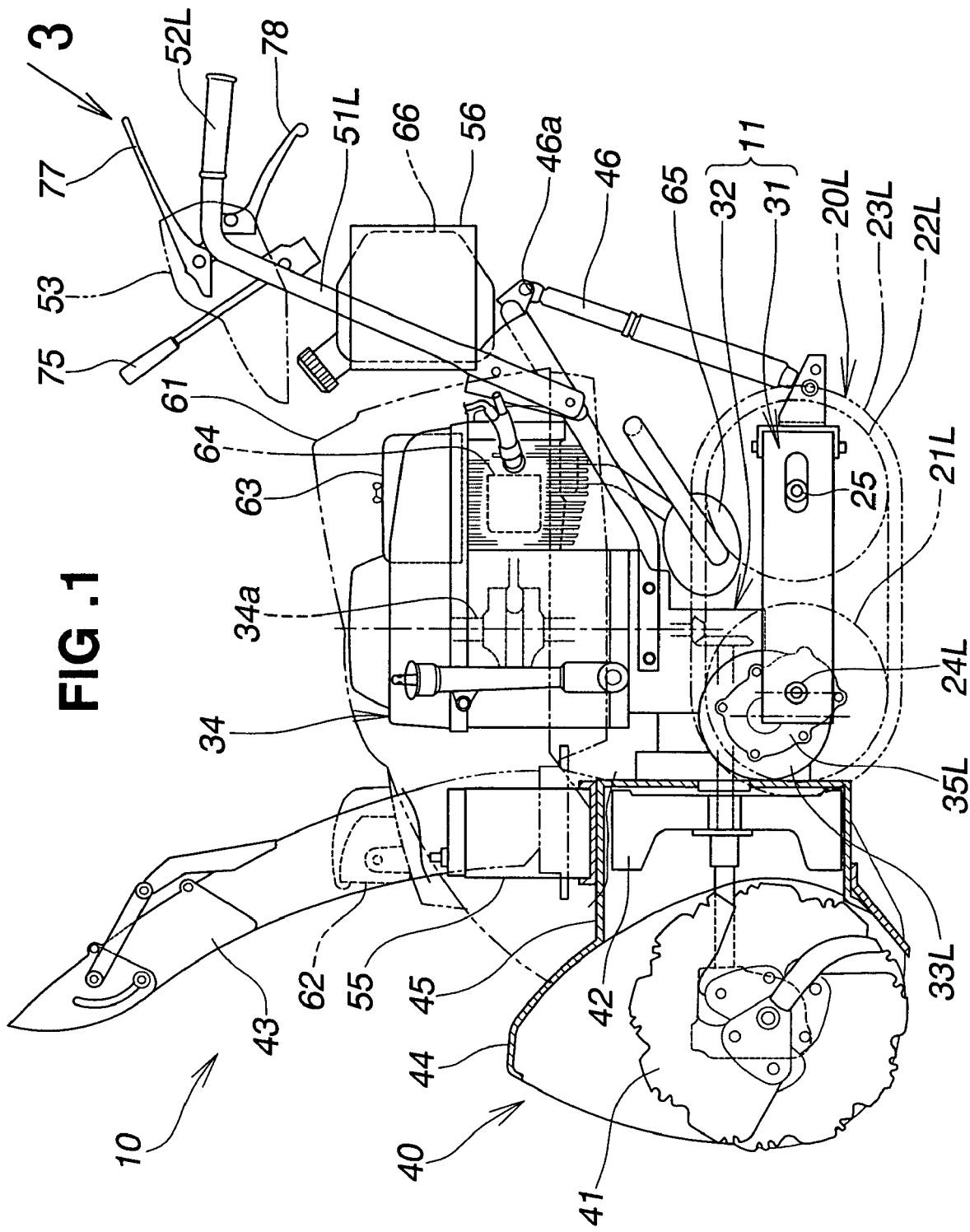
FIG. 1 is a left side elevation view of a snow removing machine according to the present invention.
Figure 2:
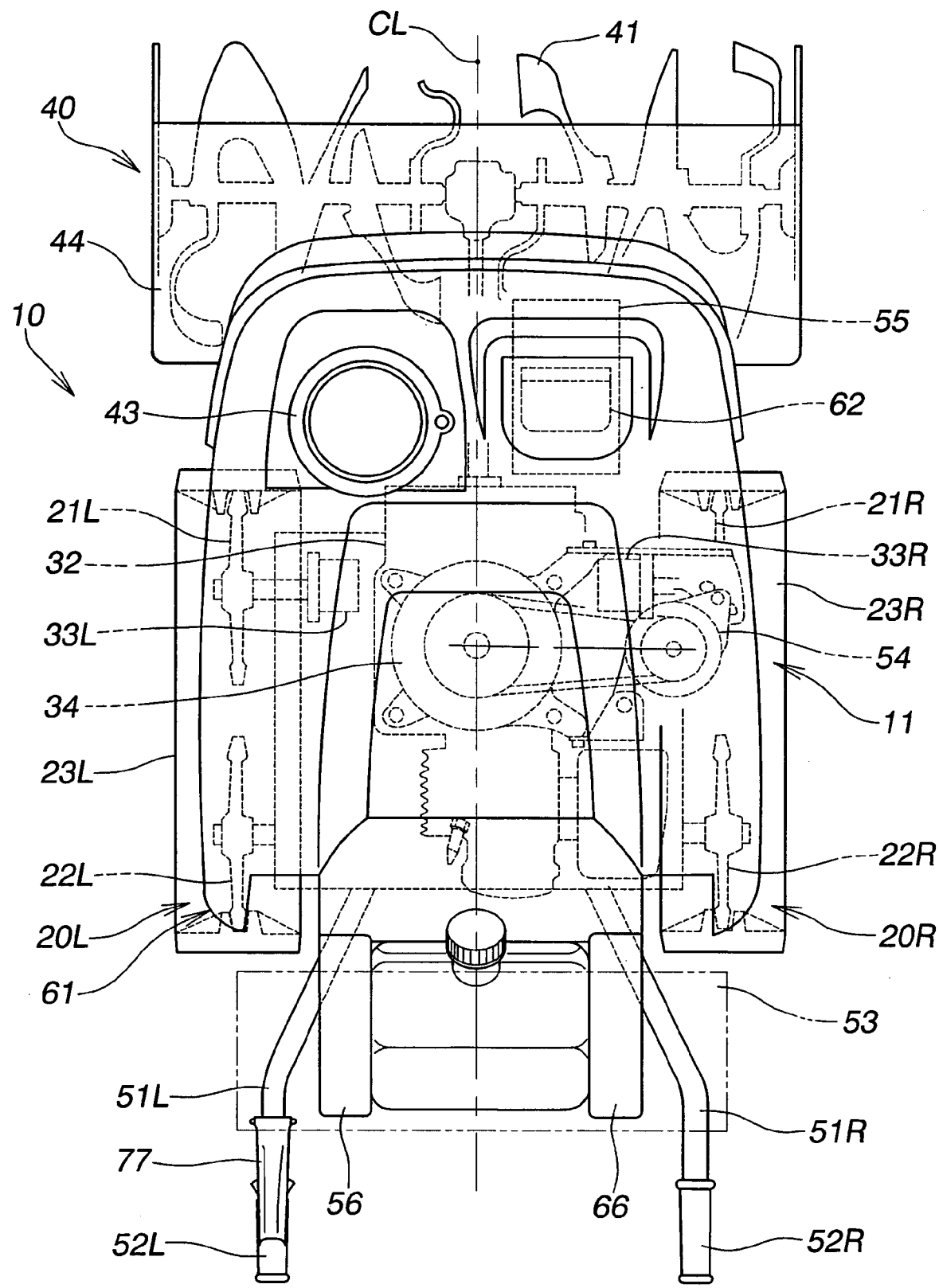
FIG. 2 is a plan view of the snow removing machine.

Referring to FIG. 1 and FIG. 2, a self-propelled walk-behind snow removing machine (an electric vehicle) 10 comprises a traveling frame 31 including left and right traveling apparatuses 20L, 20R, a transmission case 32 vertically swingably mounted on the traveling frame 31, left and right electric motors 33L, 33R mounted on left and right sides of the transmission case 32, respectively, an engine 34 (an internal combustion engine 34) mounted on an upper part of the transmission case 32, a snow-removing apparatus 40 attached to a front part of the transmission case 32, and left and right operational handlebars 51L, 51R extending upwardly and rearward from the upper part of the transmission case 32. A control board 53 is disposed between the operational handlebars 51L, 51R. A human operator manipulates the snow removing machine while walking behind the control board 53.

The traveling frame 31 and the transmission case 32 constitute a vehicle body or machine body 11 of the snow removing machine 10. Left and right grips 52L, 52R to be gripped by the human operator are probided at distal ends of the left and right operational handlebars 51L, 51R, respectively.

The snow-removing apparatus 40 is driven by the engine 34. The traveling apparatuses 20L, 20R are independently or separately driven by the electric motors 33L, 33R, respectively. The electric motor is suitable for performing precise travel speed control, a turn control and forward/rearward switching control of the snow removing machine 10. The internal combustion engine 34 is suitable for activating a working system subjected to an abrupt variation in load.

The left and right electric motors 33L, 33R are drive sources for producing a power to be transmitted by left and right traveling transmission mechanisms (only left one is shown and designated at 35L) to the traveling apparatuses 20L, 20R to drive the traveling apparatuses 20L, 20R for propelling the snow removing machine 10.

The left traveling apparatus 20L comprises a front driving wheel 21L, a rear driven wheel 22L and a crawler belt 23L entrained around the wheels 21L, 22L. The driving wheel 21L is driven by the left electric motor 33L to rotate in a forward or reverse direction for causing the crawler belt 23L to run in the forward or reverse direction. Similarly, the right traveling apparatus 20R comprises a front driving wheel 21R, a rear driven wheel 22R, and a crawler belt 23R entrained around the wheels 21R, 22R. The driving wheel 21R is driven by the right electric motor 21R to rotate in a forward or reverse direction for causing the crawler belt 23R to run in the forward or reverse direction.

Left and right axles (only left one is shown and designated at 24L) for the driving wheels 21L, 21R are rotatably supported by the traveling frame 31. An axle 25 for the driven wheels 22L, 22R is supported at a rear part of the traveling frame 31. The left and right driving wheels 21L, 21R are secured to the left and right axles. The left and right driven wheels 22L, 22R are rotatably mounted on the axle 25.

The engine 34 includes a downwardly extending crankshaft 34a. The engine 34 is a drive source for producing a power to be transmitted by a working transmission mechanism (not shown) accommodated within the transmission case 32 to the snow-removing apparatus 40 to drive the snow-removing apparatus 40 for performing a snow-removing operation.

The snow-removing apparatus 40 has an auger 41 disposed at a front part thereof, a blower 42 disposed at a rear part thereof, and a shooter 43 disposed at an upper part thereof. The apparatus 40 includes an auger housing 44 accommodating the auger 41 and a blower housing 45 accommodating the blower 42. The auger 41 acts to centrally collect snow deposited on the ground. The blower 42 picks up the collected snow to throw the snow through the shooter 43 to a desired point around the snow removing machine 10.

A swing drive mechanism 46 acts to cause the transmission case 32 and the snow-removing apparatus 40 to swing up and down on an upper portion 46a of the mechanism 46 relative to the ground. This swing movement achieves an adjustment of an orientation of the auger housing 44.

As shown in FIG. 2, the machine body 11 is equipped with a generator 54 and a battery 55 disposed at a front part thereof.

The machine body 11 of the snow removing machine 10 is equipped with the snow-removing apparatus 40, the internal combustion engine 34 for driving the snow-removing apparatus 40, the traveling apparatuses 20L, 20R, the left and right electric motors 33L, 33R for driving the traveling apparatuses 20L, 20R, the generator 54 driven by the engine 34 to supply electric power to the battery 55, and a control unit 56 for controlling the electric motors 33L, 33R. The control unit 56 may be disposed below or incorporated in the control board 53.

Reference numerals 61, 62, 63, 64, 65 and 66 denote a cover for covering the engine 34, a lamp, an air cleaner, a carburetor, a muffler for discharging an exhaust gas from the engine 34 out of the snow removing machine 10, and a fuel tank, respectively.

Figure 3:
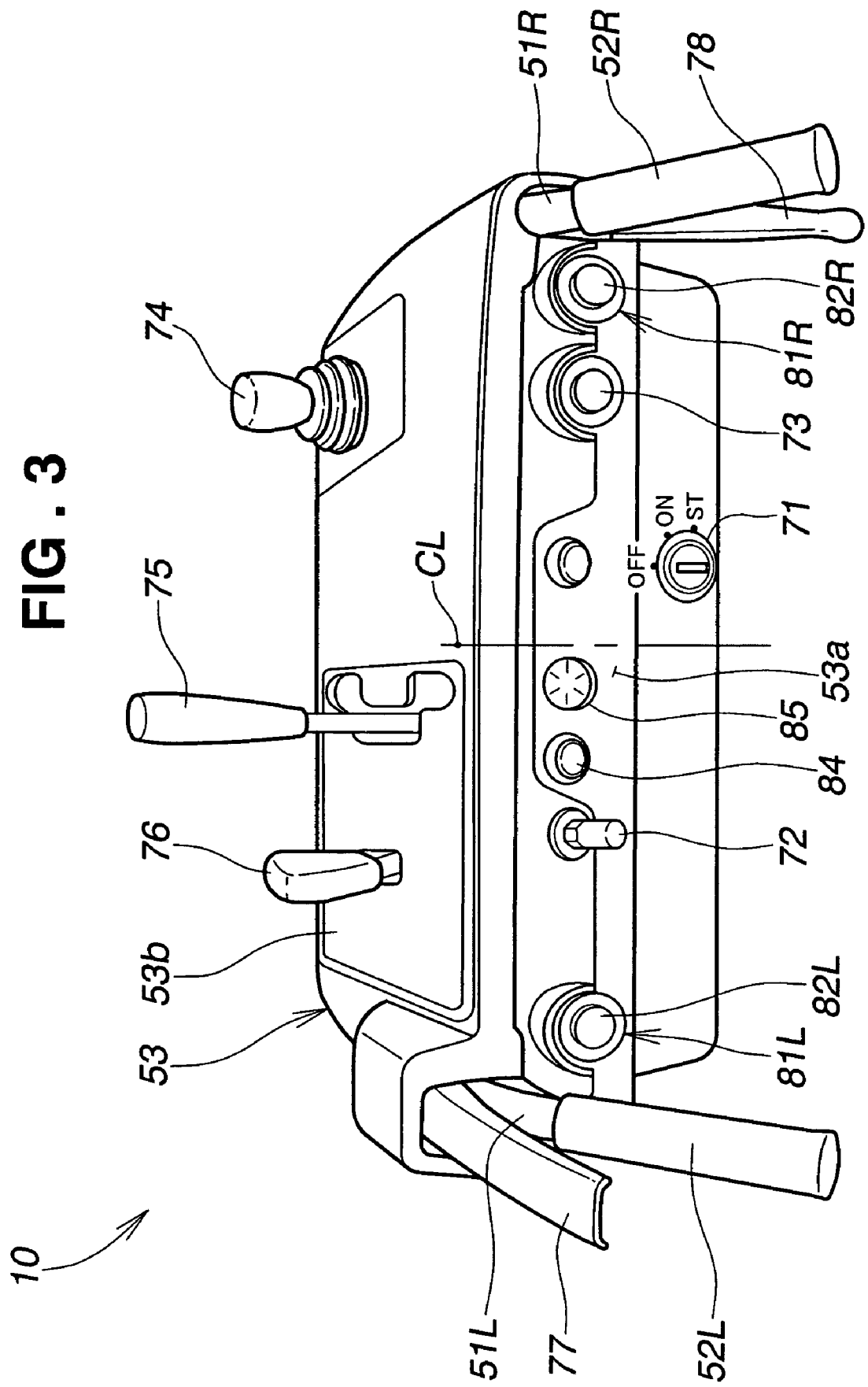
FIG. 3 is a view showing a control board as viewed in the direction of an arrow 3 of FIG. 1.

FIG. 3 is a view in the direction of an arrow 3 of FIG. 1. The control board 53 has a back side 53a on which a main switch 71, a choke knob 72 for the engine 34, a clutch operating switch 73 and the like are disposed. On an upper side 53b of the control board 53, a lever 74 for adjusting a snow throwing direction, a direction/speed lever 75 for controlling the direction and speed of travel of the snow removing machine 10 and a throttle lever 76 for the engine 34 are disposed in order from a right side to a left side of the control board 53. The grip 52L is disposed leftward of the control board 53 while the grip 52R is disposed rightward of the control board 53.

The left operational handlebar 51L is provided with a travel-ready lever 77 in the vicinity of the grip 52L. In the vicinity of the grip 52R, the right operational handlebar 51R is provided with a lever 78 adapted to be operated for driving the swing drive mechanism 46 to adjust orientation of the auger housing 44.

The main switch 71 is a well-known ignition switch having a key hole (not designated). A main key (not shown) is inserted into the key hole and turned to start up the engine 34. The main switch 71 has an off position "OFF", an on position "ON", and a start position "ST" provided in a clockwise order around the key hole of the main switch 71.

When the main key is oriented to the off position "OFF", the engine 34 is stopped and all electric system is shut down. When the main key is turned from the off position "OFF" to the on position "ON", the engine 34 remains stopped. Turning the main key to the start position "ST" starts the engine 34. When the main key is turned from the start position "ST" to the on position "ON", the started engine 34 is maintained in operation.

When the choke knob 72 is pulled, a fuel content in a fuel-and-air mixture increases.

The clutch operating switch 73 is provided for switching on or off the snow-removing apparatus 40. More specifically, the switch 73 takes the form of a push-button which, when depressed, turns on or off the auger 41 and the blower 42.

Figure 4:
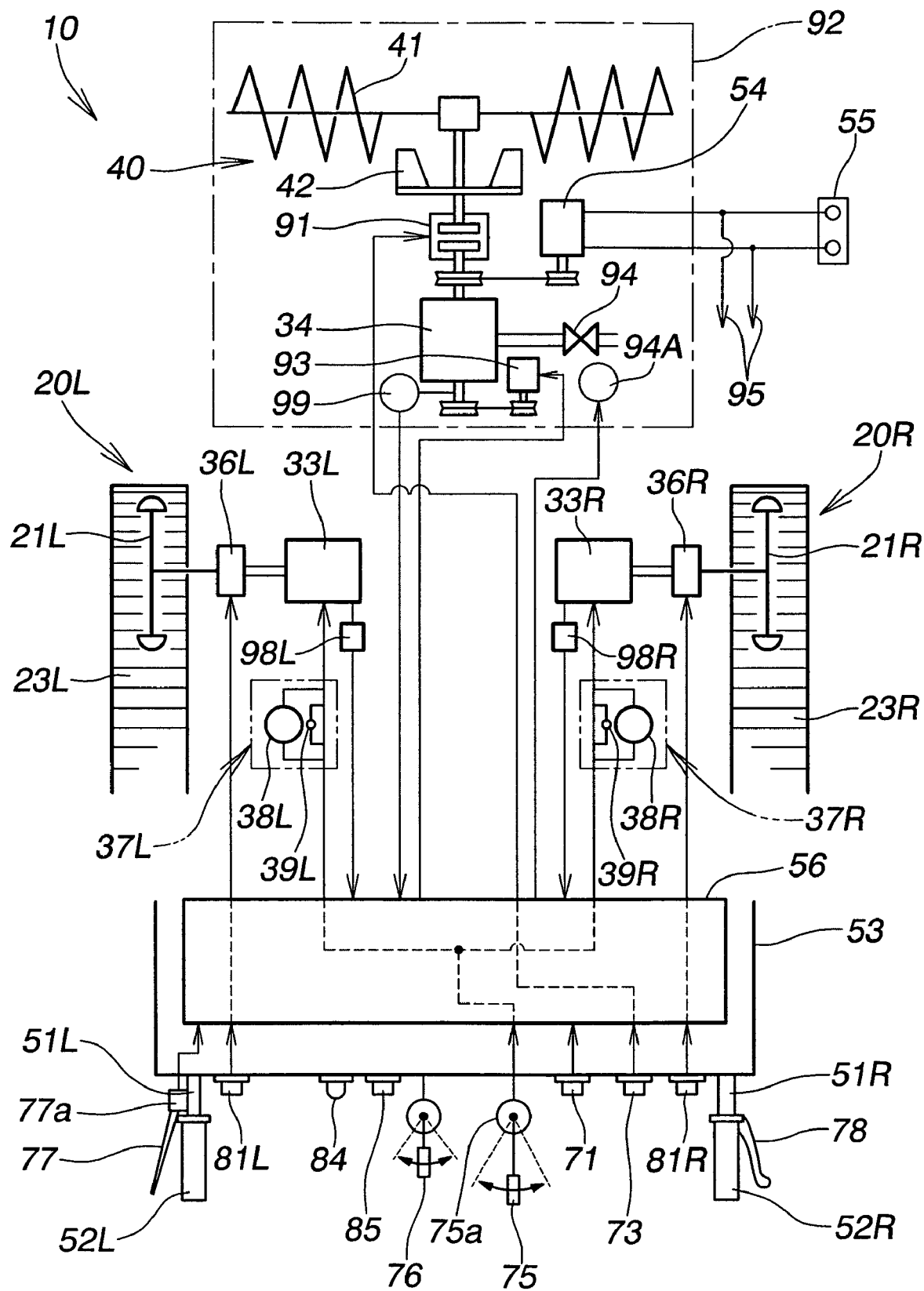
FIG. 4 is a diagrammatical view showing a control system of the snow removing machine.

The snow throwing direction adjusting lever 74 is provided for changing an orientation of the shooter 43. The direction/speed lever 75 is provided for controlling the speed of the electric motors 33L, 33R as well as rotating the electric motors 33L, 33R in a forward or reverse direction to switch operation of the snow removing machine 10 between a forward traveling mode and a rearward traveling mode. The throttle lever 76 is provided for controlling a degree of opening of a throttle valve 94 (FIG. 4) to vary speed of the engine 34. The travel-ready lever 77 is provided for operating a switch means 77a (FIG. 4). When an operator does not grip the lever 77, the lever 77 is held in a position as shown in FIG. 3 where the switch means 77a is in an off state under a pulling force of a return spring (not shown). When the operator grips the lever 77 by his left hand and lowers the lever 77 towards the grip 52L, the switch means 77a is brought to an on state.

The control board 53 includes left and right turn operating switches 81L, 81R disposed between the left and right operational handlebars 51L, 51R. These switches 81L, 81R are disposed close to the handlebars 51L, 51R, respectively, to such an extent that the operator can manipulate the switches 81L, 81R while holding the left and right operational handlebars 51L, 51R.

The left turn operating switch 81L is an auto-return type switch having a push-button 82L directed rearward of the snow removing machine 10. Only while the push-button 82L is manually depressed, the switch 81L is turned on and outputs a switch signal. Similarly, the right turn operating switch 81R is an auto-return type switch having a push-button 82R directed rearward of the snow removing machine 10. Only while the push-button 82R is manually depressed, the switch 81R is turned on and outputs a switch signal.

The left turn operating switch 81L is disposed at a left end portion of the back side 53a in the vicinity of the left grip 52L whilst the right turn operating switch 81R is disposed at a right end portion of the back side 53a in the vicinity of the right grip 52R.

When the operator grips the left and right operational handlebars 51L, 51R by his left and right hands, the left and right thumbs are directed inward of the left and right operational handlebars 51L, 51R.

The operator manipulates the snow removing machine 10 while gripping the left and right operational handlebars 51L, 51R. When the snow removing machine 10 is to be turned leftward, the operator brings his left thumb forwardly and keeps the push-button 82L of the left turn operating switch 81L depressed while gripping the operational handlebars 51L, 51R. When the snow removing machine 10 is to be turned rightward, the operator brings his right thumb forward and keeps the push-button 82R of the operating handlebar 81R depressed while gripping the operational handlebars 51L, 51R.

Therefore, the operator can easily operate the left and right operating switches 81L, 81R to turn the snow removing machine 10 leftward and rightward without releasing his hands from the operational handlebars 51L, 51R. Namely, it is not necessary for the operator to change the positions of the hands while gripping the handlebars 51L, 51R or to release the hands from the handlebars 51L, 51R each time he turns the snow removing machine leftward or rightward.

The control board 53 has an alarm indicator 84 and an alarm 85 on the back side 53a. The alarm indicator 84 is operated by an instruction from the control unit 56 and takes the form of a lamp. The alarm 85 is operated by an instruction from the control unit 56 to emit a sound or voice. The alarm 85 may be a buzzer.

Referring to FIG. 4, there are shown the control unit 56 and information transmission path connected to the control unit 56. The engine 34, the electromagnetic clutch 91, the auger 41 and the blower 42 constitute a working system 92 shown by a single dot-and-dash line. The other members constitute a traveling system. Broken lines shown in the control unit 56 denote paths for various signals from the various switches and the direction/speed lever 75 provided to the control board 53.

Now, operation of the snow-removing apparatus 40 will be discussed.

The main key is inserted into the key hole of the main switch 71 and turned to the start position "ST" to rotate a self-starting motor 93 for starting the engine 34.

The throttle lever 76 is connected through a throttle wire (not shown) to a throttle valve 94. Operation of the throttle lever 76 controls the degree of opening of the throttle valve 94, thereby controlling the speed of the engine 34.

The degree of opening of the throttle valve 94 is automatically controlled by a valve driving section 94A actuated in correspondence to a control signal from the control unit 56. The valve driving part 94A is superior to the throttle lever 76 in controlling the degree of opening of the throttle valve 94.

The electric power from the generator 94 driven by part of motive power of the engine 34 is supplied to the battery 55. The remainder of the motive power of the engine 34 is used for rotating the auger 41 and the blower 42 of the snow-removing apparatus 40. The left and right electric motors 33L, 33R are driven by the electric power supplied from the battery 55 via a harness 95. The electric power from the generator 54 and the battery 55 are supplied via the harness 95 to other electrical components.

Reference numerals 98L, 98R denote rotation sensors for detecting a rotational speed of the electric motors 33L, 33R. Reference numeral 99 denotes an engine speed sensor for detecting the speed of the engine 34.

While gripping the travel-ready lever 77, the operator switches on the clutch operating switch 73 to thereby bring the electromagnetic clutch 91 to an engaged state where the auger 41 and the blower 42 are rotated by the motive power of the engine 34. When the operator either takes the hand off the travel-ready lever 77 or switches off the clutch operating switch 73, the electromagnetic clutch 91 is brought to a disengaged state.

Operation of the traveling apparatuses 20L, 20R will be described.

Figure 5:
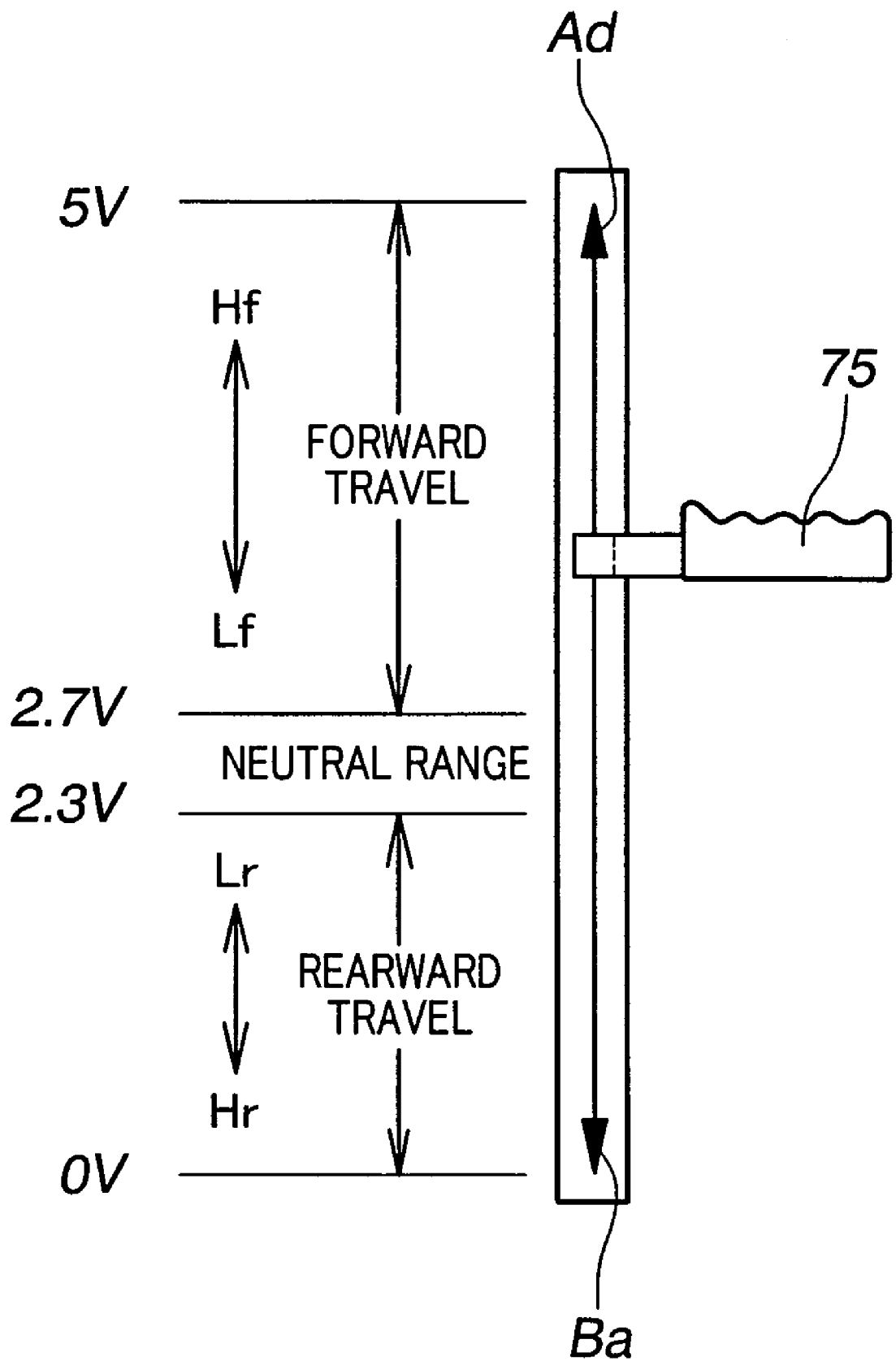
FIG. 5 is a view showing how a direction/speed lever is operated.

The snow removing machine 10 includes left and right electro-magnetic brakes 36L, 36R corresponding to a parking brake of a conventional automobile. More specifically, the respective motor shafts of the left and right electric motors 33L, 33R are braked by the electromagnetic brakes 36L, 36R. When the snow removing machine 10 is parked, the brakes 36L, 36R is controlled by the control unit 56 to be placed in an applied state (on state). The brakes 36L, 36R are brought to a released state (off state) when the operator moves the direction/speed lever 75 to "forward travel" range or "rearward travel" range as shown in FIG. 5 with the main key positioned in the on position "ON" and with the travel-ready lever 77 gripped by the operator's hand.

The direction/speed lever 75 will be explained with reference to FIG. 5.

The direction/speed lever 75 is moved by the operator's hand, as shown by arrows Ad, Ba. Moving the lever 75 from "neutral" range into "forward travel" range causes the snow removing machine 10 to travel forward. The direction/speed lever 75 can control a speed at which the snow removing machine 10 travels forward. More specifically, when the direction/speed lever 75 is positioned on a low speed side Lf of "forward travel" range, the snow removing machine 10 travels forward at a low speed. When the direction/speed lever 75 is positioned on a high speed side Hf, the snow removing machine 10 travels forward at a high speed.

Moving the direction/speed lever 75 from "neutral" range to "rearward travel" range causes the snow removing machine 10 to travel rearward. The direction/speed lever 75 can control a speed at which the snow removing machine 10 travels rearward. More specifically, when the direction/speed lever 75 is positioned on a low speed side Lr of "rearward travel" range, the snow removing machine 10 travels rearward at a low speed. When the direction/speed lever 75 is positioned on a high speed side Hr of "rearward travel" range, the snow removing machine 10 travels rearward at a high speed.

When the direction/speed lever 75 is positioned in an rearmost position of the high speed side Hr of "rearward travel" range where the snow removing machine 10 travels rearward at the highest speed, no voltage is developed with a potentiometer 75a (FIG. 4). When the direction/speed lever 75 is positioned in a foremost position of the high speed side Hf of "forward travel" range where the snow removing machine 10 travels forward at the highest speed, a voltage of 5 (V) is developed with the potentiometer 75a. When the direction/speed lever 75 is positioned within "neutral" range, a voltage between 2.3 (V) and 2.7 (V) is developed with the potentiometer 75a.

Referring back to FIG. 4, the control unit 56, when receiving from the potentiometer 75a information regarding a position of the direction/speed lever 75, rotates the left and right electric motors 33L, 33R by means of left and right motor drivers 37L, 37R. The rotation sensors 98L, 98R detect the rotational speeds of the electric motors 33L, 33R and feed back to the control unit 56 signals regarding the rotational speeds of the electric motors 33L, 33R. Based on the signals sent from the sensors 98L, 98R, the control unit 56 achieves the predetermined speeds of the electric motors 33L, 33R. As a result, the left and right driving wheels 21L, 21R rotate in a desired direction at a desired speed to propel the snow removing machine 10.

A description will be made as to how the traveling snow removing machine 10 brakes. The motor drivers 37L, 37R include regenerative brake circuits 38L, 38R and short-circuit brake circuits 39L, 39R.

A principle for operation of the regenerative brake circuits 38L, 38R is as follows. The electric motors 33L, 33R are rotated by electric energy supplied from the battery 55. The generator 54 converts its rotation into an electric energy. The electric motors 33L, 33R are changed into generators by electric switching operation and generates an electric power. When the voltage generated by the generator is higher than that of the battery 55, the electric energy can be stored in the battery 55.

While the push-button 82L of the left turn operating switch 81L is depressed, the control unit 56, on the basis of the switch signal, actuates the left regenerative brake circuit 38L to decelerate the left electric motor 33L from a speed determined by a position of the direction/speed lever 75 for turning the snow removing machine 10 leftward. During the leftward turning of the machine 10, the right electric motor 33R is controlled by the control unit 56 to have a speed determined by the position of the direction/speed lever 75.

Similarly, while the push-button 82R of the right turn operating switch 81R is depressed, the control unit 56, on the basis of the switch signal, actuates the right regenerative brake circuit 38R to decelerate the right electric motor 33L from a speed determined by the direction/speed lever 75 for turning the snow removing machine 10 rightward. During the rightward turning of the machine 10, the left electric motor is controlled by the control unit 56 to have a speed determined by the position of the direction/speed lever 75.

The snow removing machine 10 can turn leftward only while the push-button 82L of the left turn operating switch 81L is depressed. The snow removing machine 10 can turn rightward only while the push-button 82R of the right turn operating switch 81R is depressed.

The operator can stop the traveling of the snow removing machine 10 by performing one of the following three operations:

(1) Returning the main key to the start position "ST" of the main switch 71;
(2) Returning the direction/speed lever 75 to the "neutral" range; and
(3) Taking his hand off the travel-ready lever 77.

This operation for stopping the traveling of the snow removing machine 10 is performed through the use of the short-circuit brake circuits 39L, 39R after an electrically deceleration control is performed on the electric motors 33L, 33R.

The left short-circuit brake circuit 39L provides a short circuit between both poles of the left electric motor 33L for braking the electric motor 33L hard. The right short-circuit brake circuit 39R can brake the right electric motor 33R hard in the same manner as the left short-circuit brake circuit 39L.

After the snow removing machine 10 stops traveling, the main key is returned to the off position "OFF" of the main switch 71 to thereby bring the electromagnetic brakes 36L, 36R to the applied state where a brake corresponding to a parking brake used for a well-known conventional automobile is applied.

The procedure of operation of the control unit 56 will be described with reference to FIG. 6 to FIG. 10. The control unit 56 is a microcomputer. The control unit 56 starts to operate when the main key inserted into the key-hole of the main switch 71 is turned to the on position "ON" of the main switch 71.

Figure 6:
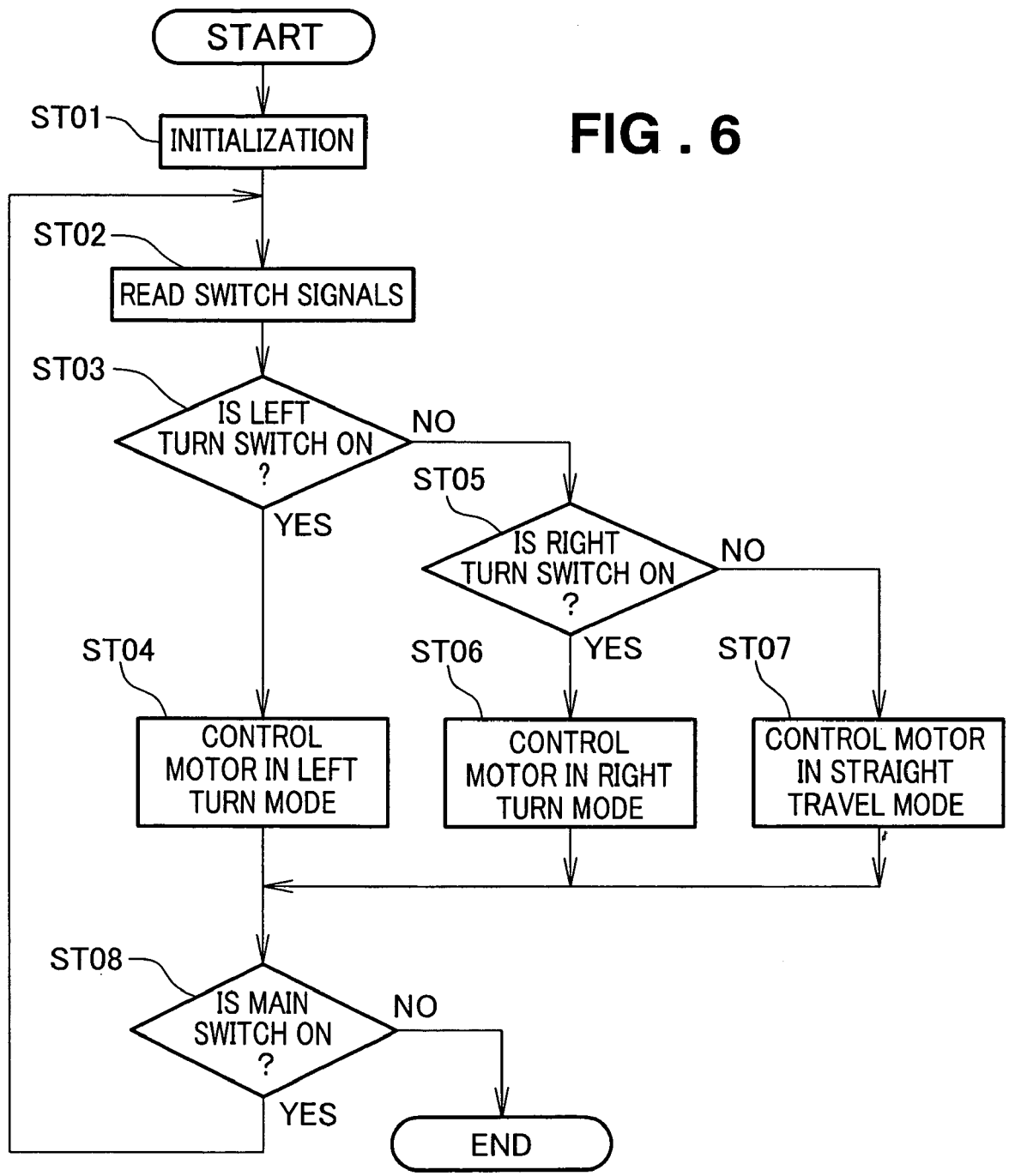
FIG. 6 is flowchart showing a control operation of a control unit is operated.

FIG. 6 shows a flowchart of the procedure of the operation of the control unit 56. It is to be noted that the characters "ST" refers to "step". At ST01, initialization is performed. ST02 reads signals indicative of states of a variety of switches and levers such as the main switch 71, the direction/speed lever 75, the switch means 77a of the travel-ready lever 77, and the left and right turn operating switches 81L, 81R. ST03 judges whether or not the left turn operating switch 81L is in the on state. If the result of judgment is "YES" (i.e., the switch 81L is in the on state), the operation of the control unit 56 proceeds to ST04. ST04 controls the electric motors 33L, 33R in a left turn mode to turn the snow removing machine 10 leftward. A subroutine for the control at ST04 will be described later with reference to FIG. 7 to FIG. 10. ST08 then makes a judgment to determine whether or not the main key inserted into the key hole of the main switch 71 is in the on position "ON" of the main switch 71. If the result of judgment is "YES" (i.e., the main key is in the on position "ON" of the main switch 71), the operation of the control unit 56 returns to ST02 and the operation at ST02 is performed again. If the result of judgment at the ST08 is "NO" (i.e., the main key is not in the on position "ON"), the operation of the control unit 56 ends.

If the result of judgment at ST03 is "NO" (i.e., the left turn operating switch 81L is not in the on state), the operation of the control unit 56 proceeds to ST05. ST05 judges whether or not the right turn operating switch 81R is in the on state. If the result of judgment is "YES" (i.e., the switch 81R is in the on state), the operation of the control unit 56 proceed to ST06. ST06 controls the left and right electric motors 33L, 33R in a right turn mode to turn the snow removing machine 10 rightward. A control subroutine performed at ST06 is substantially the same as the control subroutine at ST04 and hence its description will be omitted. After the control over the electric motors is finished, ST08 makes the same judgment as discussed above.

If the result of judgment at ST05 is "NO" (i.e., the right turn operating switch 81R is not in the on state), the operation of the control unit 56 proceeds to ST07. ST07 controls the left and right electric motors 33L, 33R in a straight travel mode to thereby propel the snow removing machine 10 straight. During the straight propulsion of the snow removing machine 10, the left and right electric motors 33L, 33R are controlled to rotate at speeds determined by a position of the direction/speed lever 75. Then, ST08 makes the same judgment as discussed above.

Figure 7:
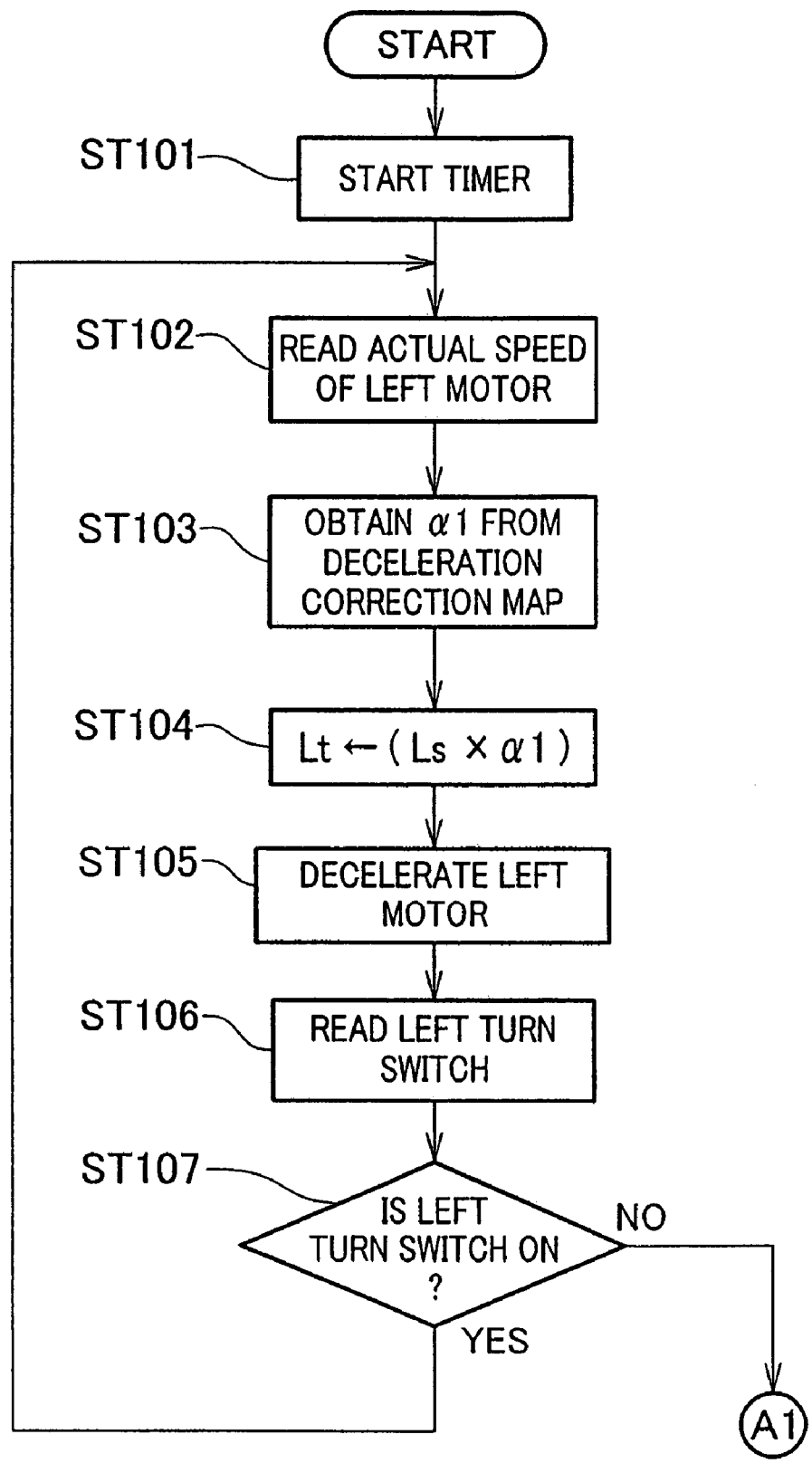
FIG. 7 is a flowchart showing the control operation of the control unit to decelerate a left electric motor for turning the snow removing machine leftward.

FIG. 7 shows a flowchart for the left turn mode in which the control unit 56 performs deceleration control to decelerate the left electric motor 33L for turning the snow removing machine 10 leftward.

ST101 resets a timer incorporated in the control unit 56 to set a count time Tc to zero, and starts the timer.

Then, ST102 reads an actual speed Ls of the left electric motor 33L detected by the rotation sensor 98L.

Figure 8:
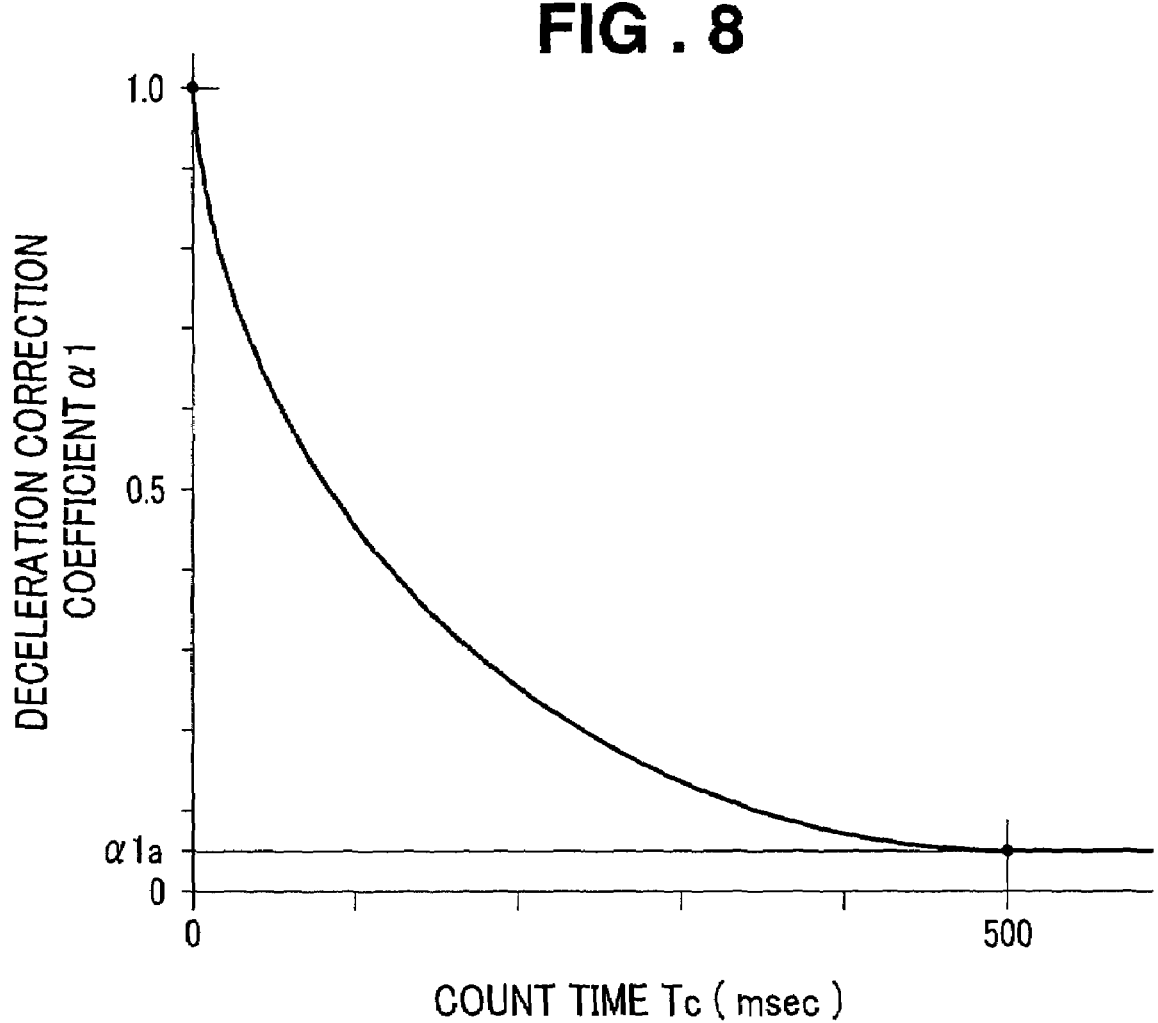
FIG. 8 is a view showing a deceleration correction map of a turning-side electric motor.

ST103 obtains a deceleration correction coefficient α 1, corresponding to a count time Tc, from a deceleration correction map of "turning-side electric motor" (i.e., the left electric motor 33L in the case of this left turn mode) as shown in FIG. 8.

The deceleration correction map of the turning-side electric motor will be discussed with reference to FIG. 8. A horizontal axis represents the count time Tc elapsed from a time at which the timer starts at ST101. A vertical axis represents a deceleration correction coefficient α 1 of the turning-side electric motor.

As can be seen from the deceleration correction map, the deceleration correction coefficient α 1 of the turning-side electric motor has the maximum value of 1.0 at the count time Tc of 0 (m sec). The value of the deceleration correction coefficient α 1 becomes gradually small as the time Tc goes on. More specifically, the upper limit value, that is, the maximum value of the deceleration correction coefficient is 1.0 while the lower limit value of the deceleration correction coefficient is a small value α 1a but not zero. The value α 1a is, for example, 0.1. The characteristic curve of the deceleration correction coefficient provides the upper limit value of 1.0 at the time Tc of 0 (msec) and the lower limit value of α 1a at the time Tc of 500 (msec).

Referring back to FIG. 7, the operation of the control unit 56 for controlling the left electric motor 33L will be explained.

ST103 is followed by ST104, which multiplies the actual speed Ls of the left electric motor 33L read at ST102 by the deceleration correction coefficient α 1 obtained at ST103 to determine a deceleration target speed Lt.

ST105 performs deceleration control of the left electric motor 33L by using a decelerating control signal Qd based on the deceleration target speed Lt for decelerating the left electric motor 33L to the speed Lt.

ST106 reads input signal indicative of a state of the left turn operating switch 81L.

ST107 judges whether or not the left turn operating switch 81L is in the on state. If the result of judgment is "YES" (i.e., the left turn operating switch 81L is in the on state), the control unit 56 judges that the operation for turning the snow removing machine 10 leftward is being performed. The operation of the control unit 56 returns to the ST102. If the result of judgment at ST107 is "NO" (i.e., the left turn operating switch 81L is not in the on state), the control unit 56 judges that the operation for turning the snow removing machine 10 leftward is finished. The operation of the control unit 56 then proceeds to ST111 of FIG. 9 through a reference character A1.

Figure 9:
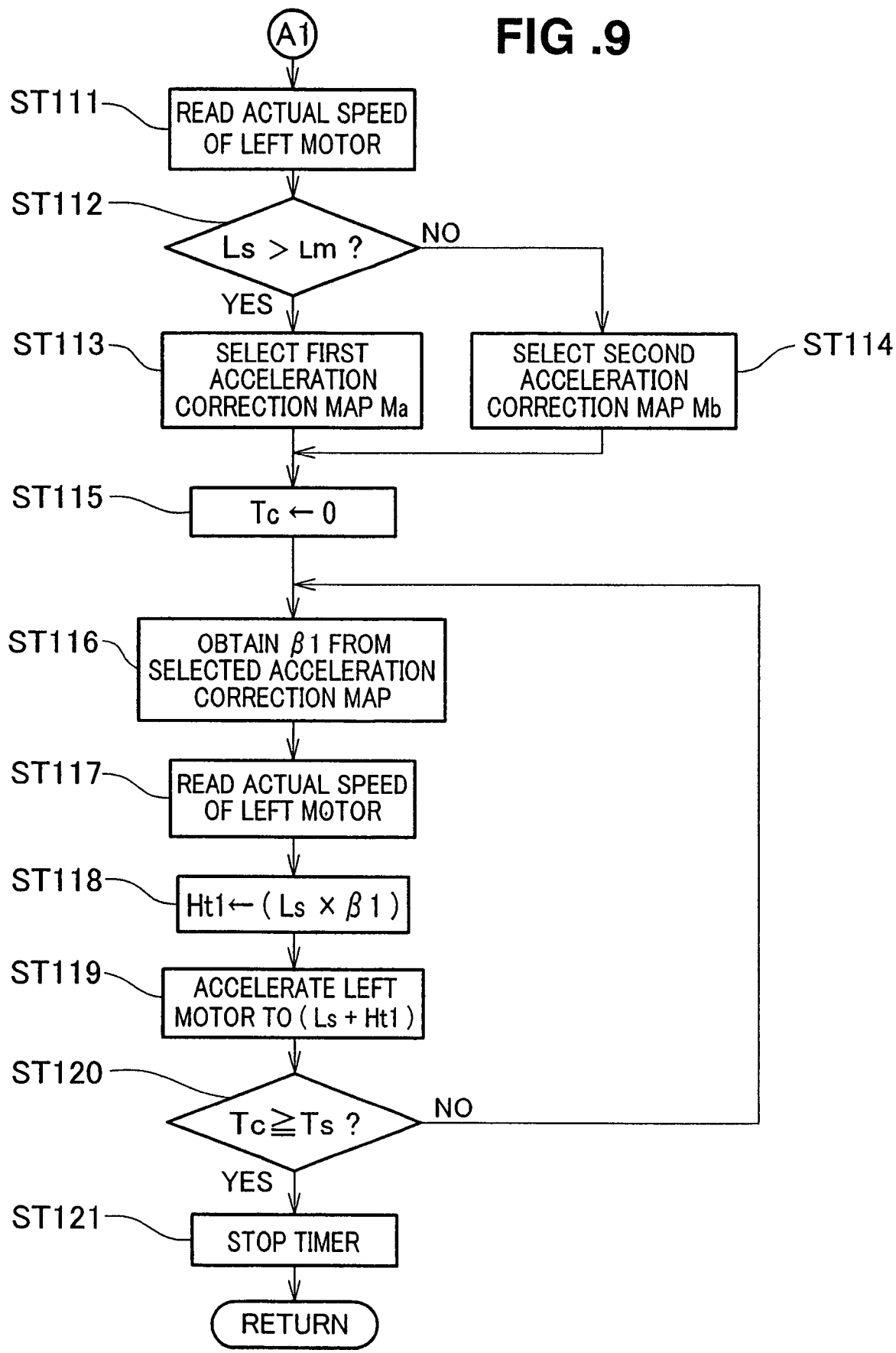
FIG. 9 is a flowchart showing the control operation of the control unit to accelerate the left electric motor for propelling the snow removing machine straightly.

FIG. 9 shows a flowchart for the left turn mode in which the control unit 56 performs acceleration control to accelerate the left electric motor 33L after the operation for turning the snow removing machine 10 leftward is finished.

ST111 reads an actual speed Ls of the left electric motor 33L (the turning-side electric motor) detected by the sensor 98L because the operation of the snow removing machine 10 is switched from the leftward turning mode to a straight-traveling mode.

Figure 10:
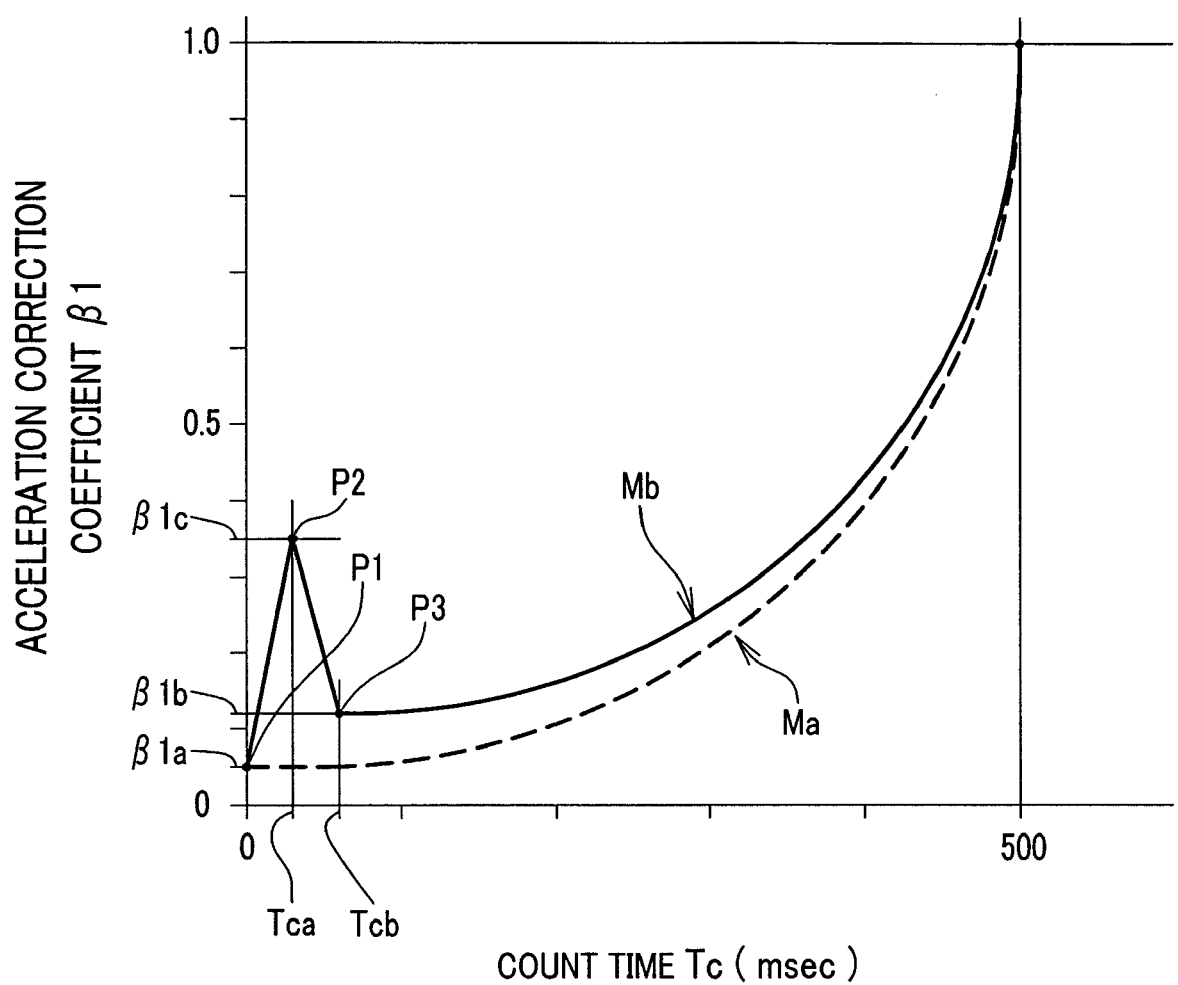
FIG. 10 is a view showing acceleration correction maps of the turning-side electric motor.
Figure 11:
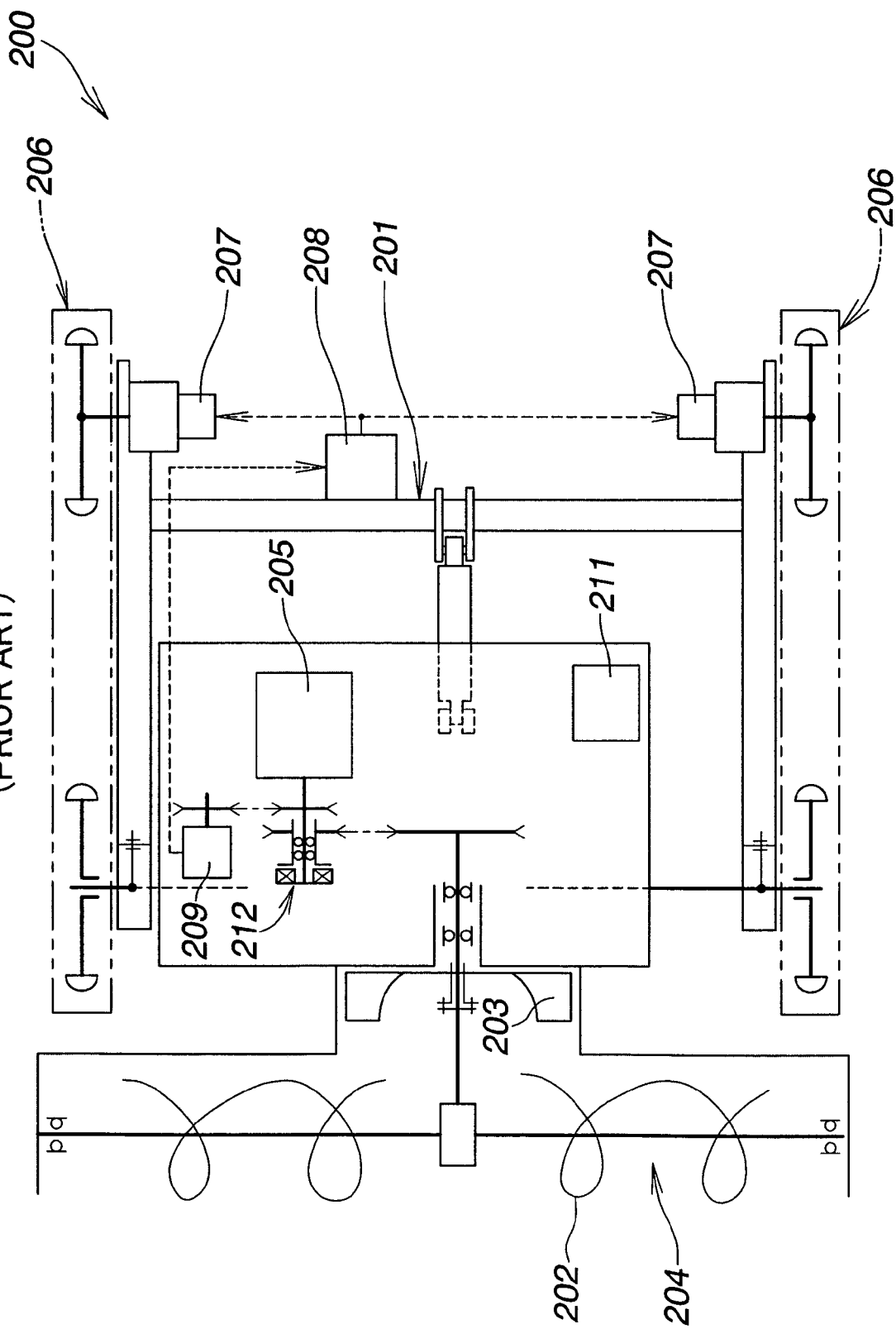
FIG. 11 is a schematic view of a conventional working machine.

ST112 makes a judgment whether or not the actual speed Ls of the left electric motor 33L exceeds a predetermined minimum reference speed Lm. If the result of judgment is "YES" (i.e., the actual speed Ls exceeds the predetermined minimum reference speed Lm), the control unit 56 judges the actual speed Ls to be in a "normal speed range" higher than the minimum reference speed Lm. The operation of the control unit 56 proceeds to ST113. ST113 selects a first acceleration correction map Ma of the turning-side electric motor as shown in FIG. 10 because the actual speed Ls is in the "normal speed range".

If the result of judgment at ST112 is "NO" (i.e., the actual speed Ls of the left electric motor 33L does not exceed the minimum reference speed Lm), the control unit 56 judges the actual speed Ls to be in a "low speed range" not exceeding the minimum reference speed Lm. The operation of the control unit 56 proceeds to ST114. ST114 selects a second acceleration correction map Mb of the turning-side electric motor as shown in FIG. 10 because the actual speed Ls is in the "low speed range".

The minimum reference speed Lm is a very low value close to 0 (rpm). More specifically, the minimum reference speed Lm is below 30 (rpm) or is so low that the driving wheel 21L rotates at a speed below 1 (rpm).

ST115 resets the count time Tc to zero and restarts the timer.

From a turning-side electric motor accelerating pattern, that is, from the acceleration correction map Ma or Mb selected at ST113 or ST114, ST116 obtains an acceleration correction coefficient β 1 corresponding to a count time Tc elapsing from a time at which the timer starts at ST115.

ST117 reads an actual speed Ls of the left electric motor 33L detected by the rotation sensor 98L.

ST118 multiplies the actual speed Ls, read at the ST111, by the acceleration correction coefficient β 1 obtained at ST116 to thereby determine an acceleration target speed Ht1 of the left electric motor 33L.

ST119 performs acceleration control of the left electric motor 33L by using an accelerating control signal Qu based on the acceleration target speed Ht1 for accelerating the left electric motor 33L. More specifically, the control unit 56 accelerates the left electric motor 33L to a speed determined by adding the acceleration target speed Ht1 to the actual speed Ls of the electric motor 33L.

ST120 judges whether or not the count time Tc has reached a predetermined reference time Ts more than 500 (msec). If the result of judgment is "YES" (i.e., the count time Tc has reached the reference time Ts), the control unit 56 judges that the acceleration control of the left electric motor 33L is completed. The operation of the control unit 56 then proceeds to ST121. ST121 stops the timer. The operation of the control unit 56 returns to ST04.

If the result of judgment at ST120 is "NO" (i.e., the count time Tc does not yet reach the reference time Ts), the control unit 56 judges that the acceleration control of the left electric motor 33L is not completed yet. The operation of the control unit 56 returns to ST116.

The acceleration correction maps Ma, Mb of the turning-side electric motor will be discussed with reference to FIG. 10.

As shown in FIG. 10, a horizontal axis represents a count time Tc (msec) elapsing from a time at which the timer starts at ST115. A vertical axis represents an acceleration correction coefficient β 1 of the turning-side electric motor. From these first and second acceleration correction maps Ma, Mb, there can be obtained an acceleration correction coefficient β 1 corresponding to the count time Tc.

In FIG. 10, a broken curve represents a characteristic curve of the first acceleration correction map Ma. The first acceleration correction map Ma is used when the actual speed Ls of the electric motor 33L or 33R is in the "normal speed range" exceeding the minimum reference speed Lm when operation of the snow removing machine 10 is switched from a leftward or rightward turning mode to a straight-traveling mode.

A solid curve shown in FIG. 10 represents a characteristic curve of the second acceleration correction map Mb. The second acceleration correction map Mb is used when the actual speed Ls of the electric motor 33L or 33R is in the "low speed range" not exceeding the minimum reference speed Lm when the operation of the snow removing machine 10 is switched from the leftward or rightward turning mode to the straight-traveling mode.

In the first and second acceleration correction maps Ma, Mb, the acceleration correction coefficient β 1 is a value close to zero at the time Tc of 0 (msec). More specifically, the acceleration correction coefficient β 1 is in the order of 0.05 at the time Tc of 0 (msec) and the upper limit value of 1.0 at the time Tc of 500 (msec).

For a normal turning of the snow removing machine 10, the actual speed Ls of the turning-side electric motor is in the "normal speed range" exceeding the minimum reference speed Lm when the operation of the snow removing machine 10 is switched from the turning mode to the straight-traveling mode. The acceleration correction coefficient β 1 is obtained from the characteristic curve of the first acceleration correction map Ma. The acceleration correction coefficient β 1 of the first acceleration correction map Ma is the minimum value β 1a (on the order of 0.05) at the time (Tc=0 (msec)) the operation of the snow removing machine 10 is switched to the straight-traveling mode. As the time Tc elapses, the acceleration correction coefficient β 1 gradually increases to the upper limit value of 1.0.

The control unit 56 performs the acceleration control to accelerate the turning-side electric motor by using the accelerating control signal Qu of which level gradually increases, in correspondence to an increase in the acceleration correction coefficient β 1, from the time at which the operation of the snow removing machine 10 is switched from the turning mode to the straight-traveling mode. Consequently, the speed of the turning-side electric motor gradually increases from the minimum speed.

In a case where the actual speed Ls of the turning-side electric motor is in the "low speed range" not exceeding the minimum reference speed Lm when the operation of the snow removing machine 10 is switched from the turning mode to the straight-traveling mode, the speed of the turning-side traveling apparatus is close to zero. In this case, the turning-side traveling apparatus is much lower in speed than the traveling apparatus opposite the turning-side traveling apparatus. If the control unit 56 uses the first acceleration correction map Ma, the speed of the turning-side electric motor would not be quickly accelerated. Therefore, the speed of the turning-side traveling apparatus can not be quickly accelerated and made equal to that of the opposite traveling apparatus under such an influence as the inertias of the traveling apparatuses 20L, 20R. In particular, the left and right crawler belts of the left and right traveling apparatuses 20L, 20R have large surface areas contacting the ground as well as large driving power. Due to these factors, therefore, the snow removing machine 10 would not be quickly switched into the straight traveling when the operation of the snow removing machine 10 is switched from the turning mode to the straight-traveling mode.

To avoid encountering such a problem, the control unit 56 uses the second acceleration correction map Mb if the speed Ls of the turning-side electric motor is in the "low speed range" at the time the operation of the snow removing machine 10 is switched from the turning mode to the straight-traveling mode.

The acceleration correction coefficient β 1 is the minimum value β 1a of the order of 0.05 at the time (Tc=0) the operation of the snow removing machine 10 is switched to the straight-traveling mode. The acceleration correction coefficient β 1 abruptly increases to β 1c from the time Tc of 0 (msec) to the time Tca. From the time Tca to the time Tcb, the acceleration correction coefficient β 1 abruptly decreases from β 1c to β 1b. After the time Tcb is elapsed, the acceleration correction coefficient β 1 gradually increases from β 1b to the upper limit value of 1.0. The acceleration correction coefficient β 1 becomes large temporarily from the time (Tc=0) at which the operation of the snow removing machine 10 is switched to the straight-traveling mode. More specifically, the acceleration correction coefficient β 1 of the second acceleration correction map Mb becomes much larger than the minimum value β 1a temporarily from the time at which the left turn operating switch 81L is switched off. During such a temporary time (i.e., from the time Tc of 0 (msec) to the time Tcb), the maximum value of the acceleration correction coefficient β 1 is β 1c of the order of 0.35.

The acceleration correction coefficient β 1 of the map Mb is characterized by varying in the form of, for example, a single pulse having a high level temporarily from the time at which the operation of the snow removing machine 10 is switched to the straight-traveling mode. Hereinafter, such a characteristic of the acceleration correction coefficient β 1 refers to "one shot pulse characteristic".

The characteristic curve of the acceleration correction coefficient β 1 of the map Mb having the one shot pulse characteristic is a triangle pulse having a starting point P1 at which the operation of the snow removing machine 10 is switched to the straight-traveling mode, a peak point P2 at which the time Tca has been elapsed and the acceleration correction coefficient β 1 is β 1c, and an end point P3 at which the time Tcb has been elapsed. The triangle pulse has a quick acceleration range from the starting point P1 to the peak point P2 where the acceleration correction coefficient β 1 abruptly increases, and an abrupt decrease range from the peak point P2 to the end point P3 where the acceleration correction coefficient β 1 abruptly decreases.

The acceleration correction coefficient β 1 is β 1a of the order of 0.05 at the starting point P1. The acceleration correction coefficient β 1 is β 1c of the order of 0.35 at the peak point P2. The acceleration correction coefficient β 1 is β 1b of the order of 0.1 at the end point P3. Thus, the following inequality holds: β 1a<β 1b<β 1c.

The time interval between the starting point P1 and the peak point P2 is about 50 (msec). The time interval between the peak point P2 and the end point P3 is about 50 (msec).

The acceleration correction coefficient β 1 becomes large temporarily from the time at which the left or right turn operating switch 81L or 81R is switched off, that is, from the time at which the control unit 56 receives a signal indicating that the operation for turning the snow removing machine 10 is finished. During the temporary period of time, the maximum value of the acceleration correction coefficient β 1 is β 1c.

The time interval between the stating point P1 and the end point P3, and the acceleration correction coefficient β 1c at the peak point P2 may be set to values other than the above-mentioned values unless an actual behavior of the snow removing machine 10 is adversely affected.

The waveform of the one shot pulse characteristic is preferably triangular or substantially triangular, but may be others such as a square waveform.

The accelerating control signal Qu output from the control unit 56 to the left electric motor 33L (i.e., the turning-side electric motor) at ST119 of FIG. 9 has a level corresponding to the acceleration correction coefficient β 1 of the turning-side electric motor. Therefore, the level of the accelerating control signal Qu greatly increases as the acceleration correction coefficient β 1 greatly increases. Namely, temporarily from the time at which the left turn operating switch 81L is switched off, that is, from the time at which the control unit 56 receives the signal indicating that the operation for turning the snow removing machine 10 leftward is finished, the level of the signal Qu output to the turning-side electric motor 33L increases from the minimum value Qumi corresponding to the acceleration correction coefficient β 1a. During the temporary period of time, the maximum level of the signal Qu corresponds to the maximum acceleration correction coefficient β 1c.

Because the acceleration correction coefficient β 1, that is, the level of the accelerating control signal Qu output to the turning-side electric motor 33L becomes very large temporarily from the time at which the left turn operating switch 81L is switched off, the turning-side electric motor 33L is quickly accelerated such that the speed of the turning-side electric motor 33L is quickly made equal to the speed of the opposite electric motor 33R.

The control of the electric motor by the decelerating control signal Qd and accelerating control signal Qu is a proportional plus integral control, or proportional plus integral plus derivative control.

A pulse voltage having a modulated pulse width corresponding to the level of the decelerating control signal Qd or accelerating control signal Qu is applied to terminals of the left and right electric motors 33L, 33R for controlling the electric motors 33L, 33R.

Where the actual speed of the turning-side electric motor is in the "low speed range" not exceeding the predetermined minimum reference speed Lm (close to zero) at the time the operation of the snow removing machine 10 is switched from the turning mode to the straight-traveling mode, the control unit 56 performs the acceleration control for achieving a quick acceleration of the turning-side electric motor by using the accelerating control signal Qu abruptly increasing in level temporarily from the time at which the operation of the snow removing machine 10 is switched to the straight-traveling mode.

As a result, the turning-side electric motor can be quickly accelerated from a low speed close to zero. The speed of the turning-side electric motor can be quickly made equal to the speed of the opposite electric motor, whereby the crawler belt of the turning-side traveling apparatus can be quickly equal in speed to that of the crawler belt of the opposite traveling apparatus. Thus, the snow removing machine 10 can rapidly smoothly switch from the turning to the straight traveling without giving the operator an unpleasant sensation of handling the snow removing machine 10.

The present invention is useful for enabling such an electric vehicle having, in particular, crawler belts as the snow removing machine 10 to be switched from the turning to the straight traveling. It is noted that the present invention is not limited to the snow removing machine 10 but applicable to an electric golf cart, an electric vehicle used for transportation, or other various types of electric vehicles.

The control unit 56 has a memory incorporated therein. Such a memory has the deceleration correction map and the first and second acceleration correction maps Ma, Mb preset therein. The control unit 56 reads out the map properly from the memory to obtain the correction coefficient for control over the electric motor. The respective maps are graphically shown in FIG. 8 and FIG. 10 for an easy understanding. The maps may be shown in other suitable forms. The characteristic curves of the deceleration correction coefficient α 1 and the acceleration correction coefficient β 1 may be expressed by mathematical operators or the like.

The characteristic curves of the deceleration correction coefficient α 1 and the acceleration correction coefficient β 1 may be shown not in a two dimensional form having two axes showing the time Tc and the correction coefficient but in a three dimensional form having three axes showing the time Tc, the correction coefficient and the actual speed of the electric motor.

Obviously, various minor changes and modifications of the present invention are possible in the light of the above teaching. It is therefore to be understood that within the scope of the appended claims the invention may be practiced otherwise than as specifically described.

What is claimed is:

1. An electric vehicle comprising:
   a vehicle body;
   left and right crawler belts disposed on respective left and right sides of the vehicle body;
   left and right electric motors for driving the respective left and right crawler belts; and
   a control unit for independently controlling each of the left and right electric motors, the control unit having:
   a turning-side electric motor decelerating control function of, when the electric vehicle turns either leftward or rightward. performing deceleration control to decelerate one of the left and right electric motors disposed on the same side as the turning direction of the electric vehicle; and
   a turning-side electric motor accelerating control function of outputting an accelerating control signal for performing acceleration control to accelerate said one of the left and right electric motors when operation of the electric vehicle is switched from a turning mode to a straight-traveling mode,
   wherein when said one of the left and right electric motors has a speed not exceeding a predetermined minimum reference speed at the time of the switching of the operation of the electric vehicle from the turning mode to the straight-traveling mode, the turning-side electric motor accelerating control function performs the acceleration control such that a level of the accelerating control signal is increased abruptly for a temporary time from the switching of the operation of the electric vehicle from the turning mode to the straight-traveling mode, and
   wherein the turning-side electric motor accelerating control function of the control unit performs the acceleration control by using an acceleration correction map represented by an acceleration correction coefficient versus time characteristic curve including a pulse-like raised portion having a starting point coinciding with the time of the switching of the operation of the electric vehicle from the turning mode to the straight-traveling mode, a peak point and an end point, the acceleration correction coefficient increasing from the starting point to the peak point and decreasing from the peak point to the end point, the acceleration correction coefficient at the end point being larger than at the starting point.

2. An electric vehicle according to claim 1; wherein the acceleration correction coefficient at the peak point is set such that the speed of said one of the left and right electric motors is increased by substantially 35%.

3. An electric vehicle according to claim 1; wherein the pulse-like raised portion of the characteristic curve is triangular.

4. An electric vehicle comprising:
   a vehicle body;
   a pair of traveling apparatuses disposed on opposite sides of the vehicle body; p1 a pair of electric motors for driving the respective traveling apparatuses; and
   a control unit for independently controlling each of the electric motors, the control unit having:
   a turning-side electric motor decelerating control function of when the electric vehicle turns in a first direction or in a second direction opposite to the first direction, performing deceleration control to decelerate one of the electric motors disposed on the same side as the turning direction of the electric vehicle; and
   a turning-side electric motor accelerating control function of outputting an accelerating control signal for performing acceleration control to accelerate said one of the electric motors when operation of the electric vehicle is switched from a turning mode to a straight-traveling mode,
   wherein when said one of the electric motors has a speed not exceeding a predetermined minimum reference speed at the time of the switching of the operation of the electric vehicle from the turning mode to the straight-traveling mode, the turning-side electric motor accelerating control function performs the acceleration control such that a level of the accelerating control signal is increased abruptly for a temporary time from the switching of the operation of the electric vehicle from the turning mode to the straight-traveling mode, and
   wherein the turning-side electric motor accelerating control function of the control unit performs the acceleration control by using an acceleration correction map represented by an acceleration correction coefficient versus time characteristic curve including a pulse-like raised portion having a starting point coinciding with the time of the switching of the operation of the electric vehicle from the turning mode to the straight-traveling mode, a peak point and an end point, the acceleration correction coefficient increasing from the starting point to the peak point and decreasing from the peak point to the end point, the acceleration correction coefficient at the end point being larger than at the starting point.

5. An electric vehicle according to claim 4; wherein the acceleration correction coefficient at the peak point is set such that the speed of said one of the electric motors is increased by substantially 35%.

6. An electric vehicle according to claim 4; wherein the pulse-like raised portion of the characteristic curve is triangular.

7. An electric vehicle comprising:
   a vehicle body;
   a pair of traveling apparatuses disposed on opposite sides of the vehicle body;
   a pair of electric motors for independently driving the respective traveling apparatuses; and
   a control unit for independently controlling each of the electric motors to control driving of the electric vehicle between first and second traveling modes by independently driving the respective traveling apparatuses, the control unit comprising decelerating control means for decelerating a first one of the electric motors disposed on a side of the vehicle body corresponding to a turning direction of the electric vehicle, and accelerating control means for outputting an accelerating control signal for performing acceleration control to accelerate the first electric motor when operation of the electric vehicle is switched from the first traveling mode to the second traveling mode so that if the first electric motor has a speed not exceeding a predetermined reference speed, the accelerating control means performs the acceleration control such that a level of the accelerating control signal is increased abruptly for a temporary time from the switching of the operation of the electric vehicle from the first traveling mode to the second traveling mode, the control unit having a memory for storing an acceleration correction map represented by an acceleration correction coefficient versus time characteristic curve including a pulse-like raised portion having a starting point coinciding with the time of the switching of the operation of the electric vehicle from the first mode to the second mode, a peak point and an end point, the acceleration correction coefficient increasing from the starting point to the peak point and decreasing from the peak point to the end point, the acceleration correction coefficient at the end point being larger than at the starting point.

8. An electric vehicle according to claim 7; wherein the accelerating control means controls acceleration by reading out the acceleration correction map stored in the memory to obtain the acceleration correction coefficient.

9. An electric vehicle according to claim 8; wherein the accelerating control means controls acceleration to increase the level of the accelerating control signal so that the speed of the first electric motor is increased by substantially 35%.

10. An electric vehicle according to claim 7; wherein the pulse-like raised portion of the characteristic curve is substantially triangular.

* * * * *